United States Patent [19]

Malinski

[11] Patent Number: 5,060,581
[45] Date of Patent: Oct. 29, 1991

[54] STEERING WHEEL TRAY APPARATUS

[76] Inventor: Carole S. Malinski, 8 Arden Ct., Oak Brook, Ill. 60521

[21] Appl. No.: 653,082

[22] Filed: Feb. 7, 1991

[51] Int. Cl.[5] ............................................. A47B 37/00
[52] U.S. Cl. ................................... 108/44; 248/441.1
[58] Field of Search ...................... 108/44, 47; 211/88; 229/276; 248/489, 447, 460, 441.1, 444

[56] References Cited

U.S. PATENT DOCUMENTS

| 2,211,962 | 8/1940 | Morris | 108/44 X |
| 2,459,443 | 1/1949 | Mabry | 108/44 |
| 2,503,602 | 4/1950 | Titley | 108/47 X |
| 3,643,606 | 2/1972 | Vise | 108/44 |
| 3,817,190 | 6/1974 | Evangelista | 108/44 |
| 3,828,994 | 8/1974 | Hollins | 108/44 X |
| 4,287,621 | 9/1981 | Kertz | 224/276 X |
| 4,770,107 | 9/1988 | Miller | 108/44 |

Primary Examiner—Peter A. Aschenbrenner
Attorney, Agent, or Firm—Ronald M. Goldman

[57] ABSTRACT

A foldable stowable portable steering wheel mounted tray apparatus of inexpensive construction permits the automobile driver to comfortably dine while seated behind the steering wheel. The tray apparatus provides a tray surface on which to dispose food and to prop reading material in an upright position. Adjustments are provided for accommodating the tray to the angular orientation between the steering wheel column and the horizontal, the tilt angle, as differs between various models of automobiles, to maintain the tray level. The tray is pivotally mounted along a longitudinal edge to a back panel that in turn is supported on the steering wheel. Straps extending from the back panel to the tray suspend the opposed end of the tray maintaining same to a level position. Angular adjustment is achieved by changing the length of restraining straps. A brass brad is inserted through slits in the strap to bunch together a portion of the strap's end thereby adjusting the length of the remainder of the strap.

14 Claims, 1 Drawing Sheet

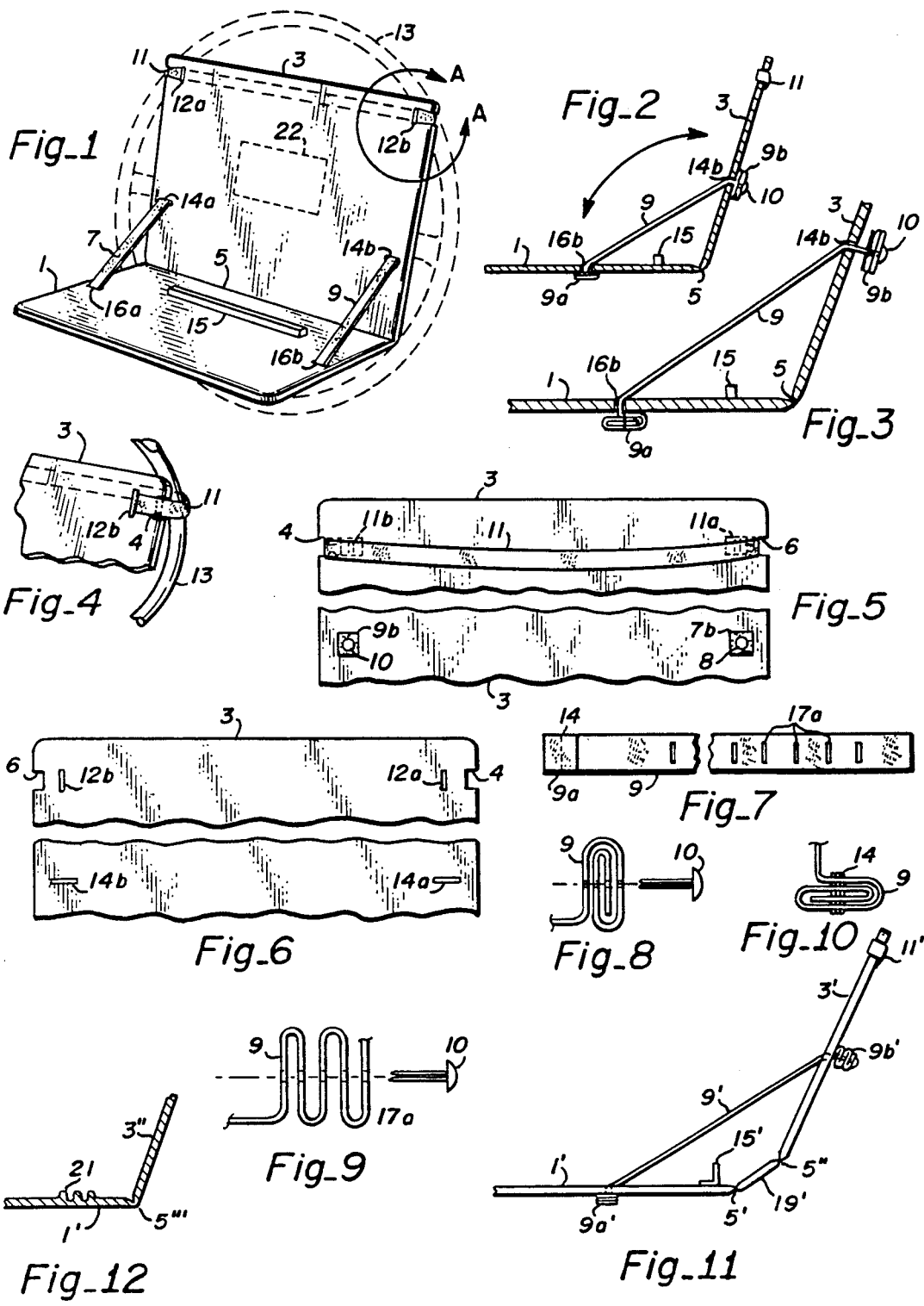

STEERING WHEEL TRAY APPARATUS

FIELD OF THE INVENTION

This invention relates to portable serving trays and, more particularly, to stowable foldable food serving tray apparatus intended for attachment to a vehicle steering wheel.

BACKGROUND

The widespread availability of a multitude of "drive-thru" restaurants has encouraged the automobile driver to consume foods and beverages in the driver's automobile, usually from behind the steering wheel. That phenomenon did not go unnoticed by some inventors who sought to bring greater convenience to such drivers by devising means to allow the driver to sit behind the steering wheel and leisurely partake of food and beverage without risk of spilling food or drink on one's clothing From the invention of the predecessor "drive-in" restaurant, prior inventors sought to present means by which the drive-in service could allow the automobile driver self-assured dining while seated in the driver's seat, as evidenced by the steering wheel supported serving trays presented in U.S. Pat. No. 2,211,962, granted Aug. 20, 1940 to Morris and U.S. Pat. No. 2,299,025, granted Oct. 13, 1942 to McGinley. Of more recent vintage, a relatively planar shaped food tray adapted to temporarily mount to the automobile steering wheel is presented in U.S. Pat. No. 4,805,867, granted Feb. 21, 1989 to McAllister and U.S. Pat. No. 4,915,035, granted Apr. 10, 1990 to Clark, et. al, with the former being a one piece structure.

Due to their construction the McAllister and Clark food trays would appear to offer an inexpensive, easily stowable and easily manufacturable utensil that seems difficult to match overall in ease of manufacture and application. However, the applicant has not seen those trays on the market. One may speculate as to the reason: For one, the many different models of automobiles, more likely than not, have different diameter steering wheels. Additionally, steering wheels in different auto models may be mounted at slightly different angles relative to the horizontal. Thus, some difficulty may be expected in providing a tray of the foregoing type in a standard size and design useful on all automobiles avoids any vertical tray tilt, when placed in use, as would encourage spillage. Without universal application, the cost advantage of a single piece structure is lost. Further, the mounting of the foregoing tray apparatus is of a cantilever type support. That support arrangement places great stress at the support on the tray as could make the respective trays impractical in an economic sense.

Though more complex in structure than the foregoing, the tray presented in Vice, U.S. Pat. No. 3,643,606, granted Feb. 22, 1972, contains two parts, a tray portion and a back portion, pivotally connected together and, hence, foldable, with the back portion being attached to the steering wheel by means of a connecting yoke located on the back portion's back side. When removed from the steering wheel the assembly may be folded flat and stowed out of the way under the automobile seat. As those skilled in the art appreciate from inspection of the Vice patent, the structure illustrated in Vice is somewhat rugged in construction. It allows for tray angle adjustment by means of a spring loaded rachet arrangement formed in the pivot joint. As one appreciates, while the Vice structure appears worthwhile, due to the mechanisms employed it is not the low cost type of article as would be given away by the restaurant proprietor to its customers as a premium, free of charge or at a very low price. That tray also does not appear on the marketplace to the present inventor's knowledge.

Though not designed for mounting on the automobile steering wheel, a low cost automobile tray is presented in U.S. Pat. No. 3,817,190, granted June 18, 1974 to Evangelista, entitled "Collapsible Tray with Adaptable Arrangement". Evangelista presents a two-part foldable tray structure in which the tray portion may be oriented at a 90 degree angle relative to the back portion by means of a series of strings threaded through openings to effectively suspend the tray portion from the back, retaining the tray at a ninety degree angle with respect to the back. Evangelista avoids the problem with variation in steering wheel tilt angles by instead using the automobile door as a support By hanging the back portion on a hook on the automobile door, much like hanging a picture frame, the steering wheel tilt angle is avoided as a design consideration Though constructed of simple component elements, the threading of string in a serpentine like arrangement through the many holes, six in each of the tray and back portions in the specific example given in Evangelista, and adjusting their lengths obviously involves considerable time and labor, as would add to the cost of manufacture. Though exemplary in simplicity, the Evangelista design does not serve the present needs and does not appear particularly well suited to low cost mass production.

An object of the present invention is to provide a stowable foldable steering wheel tray of novel structure that may be easily adjusted to permit use in various models of automobiles and is adapted to mass production manufacture.

An additional object of the invention is to provide a low cost steering wheel mounted food tray constructed from readily available materials that is suitable for use by a restaurant as a premium promotional item.

An ancillary object of the invention is to provide a tray that not only supports edibles but also permits use as a resting reading material to permit the driver to read while dining.

SUMMARY OF THE INVENTION

A foldable stowable portable steering wheel mounted tray apparatus of inexpensive construction permits the automobile driver to comfortably dine while seated behind the steering wheel. The tray apparatus provides a tray surface on which to dispose food and prop reading material in an upright position. Adjustments are included for accommodating the tray to the angular orientation between the steering wheel axis and the horizontal, the tilt angle, as differs between various models of automobiles, to maintain the tray level.

The tray apparatus, according to the invention, includes a relatively planar tray portion to serve as a tray and another relatively planar back portion for mounting to the automobile steering wheel, with the back portion being pivotally connected to the tray portion, suitably by an elongate hinge connection, anchoring a rear longitudinal edge of the tray portion. A pair of connector straps, one disposed on each of the right and left sides of the back portion spaced from the pivot axis, extends from the back portion to the tray portion at positions there along spaced from the pivot axis to suspend and hold the tray portion at a predetermined angle, level, relative to the horizontal. The straps are strong and non-stretchable, yet are limp and may be looped and/or folded, as a web or ribbon. Suitably each of the afore recited connector straps are characterized by a series of slits spaced along the length and a metal brad, whereby an end of the strap may be folded over with a selected number of slits being placed in axial alignment and the brad is disposed with the brad's legs inserted through the slits. The length of the strap remaining unfolded thereby depends on the number of folds held bunched together by the brad, wherein the angular orientation between the tray portion may be adjusted. The tray assembly's back portion includes a rectangular notch on each of the right and left sides, symmetrically placed, and a ribbon like support strap extends from the front left side of the back portion through the notch and around the rear side of the back portion to a like position on the right side, defining a loop that may be captured and held upon the circular periphery of the steering wheel rim. By slipping the loop over the top of the steering wheel and pulling the tray downwardly until the loop is taut, the tray apparatus is thus easily supported upon the steering wheel. As an additional feature a ledge is provided on the tray portion for permitting reading material to be retained in an upright position.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustrations thereof presented in the accompanying drawings.

BRIEF DESCRIPTION OF THE DRAWINGS

In the drawings:

FIG. 1 illustrates in perspective view a preferred embodiment of the invention as positioned on a steering wheel;

FIG. 2 illustrates the embodiment of FIG. 1 in side elevation view;

FIG. 3 is a partial pictorial side section view to enlarged scale of a portion of the view of FIG. 2 to better illustrate of a connector strap element;

FIG. 4 presents an enlarged view of the upper right corner of the embodiment of FIG. 1 taken along A—A, illustrating a steering wheel connector strap in greater detail;

FIG. 5 is a fragmentary elevation rear view of the to the tray assembly of FIG. 1 and FIG. 6 is the same view of the back panel of FIG. 5 with the steering wheel connector straps omitted;

FIG. 7 illustrates a partially formed connector strap or web used in the embodiment of FIG. 1;

FIG. 8 illustrates pictorially to an enlarged scale one end of the connecting straps of FIG. 7 in partially assembled form;

FIG. 9 illustrates in side pictorial view an alternative assembly for the connector strap end of FIG. 8;

FIG. 10 illustrates in side pictorial view to an enlarged scale the construction of an opposite end of the strap of FIG. 6 connector;

FIG. 11 illustrates in side elevation view an alternative embodiment of the tray apparatus containing dual hinge joints; and FIG. 12 illustrates a partial side section view of an alternative embodiment that contains longitudinally extending grooves on the tray surface.

DETAILED DESCRIPTION OF THE PREFERRED EMBODIMENTS

As illustrated in perspective view in FIG. 1, the tray assembly includes a base or tray portion, 1, which, preferably, is a generally flat planar rectangular surface suitable for receiving plates and cups, and a back panel portion, 3, also generally of a flat planar rectangular shape. Back portion 3 is pivotally connected along a longitudinal edge to tray portion 1 by a hinge connection, represented at 5, that extends across the length of the tray and back portions The tray portion is suspended or held in the horizontal position by means of two connectors, strap 7 on the left, and strap 9 on the right side in the figure, which are formed of straps, or as variously termed, ribbon like webs, suitably of woven nylon material, the details of which are discussed hereafter.

As illustrated, one end of each such connector strap is connected to back portion 3 and the strap's other end is connected to tray portion 1 at positions spaced from hinge 5. This mechanical connection is preferably made at the rear side of the surface of the respective back and tray portions, not visible in this figure, with straps extending through slots 14a and 16a in the respective back and tray portions, and strap 9 extending through slots 14b and 16b in those respective portions. Slots 14a and 14b are located at a position along back panel 3 intermediate the top and bottom edges, a predetermined distance from hinge 5 and the slots are located generally symmetrically arranged in the respective panel. Slots 16a and 16b are located at a position along the tray, intermediate the front and back ends a predetermined distance forward of hinge 5. The latter slots are also generally symmetrically located on the tray. Straps 7 and 9, of equal length, suspend the tray or, as variously termed, restrain the tray, to a predetermined angular orientation between the two portions as determined by the length of the strap "played out" between the panel and tray. This effectively restrains the tray from further pivotal unfolding movement about hinge 5 under force of the tray's weight A third connector strap, 11, is located on the top side of panel 3. This strap extends at least from the left front side of the back portion, at slot 12a, in a relatively horizontally extending loop about the rear of the back portion to at least a position at the upper right front side of the back portion at slot 12b. A raised protrusion or ledge, 15, is attached to, as by adhesive, or is formed upon the upper side of tray portion 1 This ledge extends longitudinally across a substantial portion of the length of the tray and is spaced from and for best result essentially extends parallel to the axis of hinge 5. The height and position of ledge 15 is such as not to materially interfere with folding of the tray apparatus for storage.

As illustrated with the tray opened for use and mounted to a steering wheel, 13, represented in invisible lines, the extent of the long narrow loop formed by strap 11 is of a length, between opposed right and left ends in the figure, that is less than the rim diameter of steering wheel 13. Consequently, the loop is effectively captured and held in place by and on the steering wheel, serving as a collar or yoke to the steering wheel.

As is conventional the automobile steering wheel contains a circular rim, a central hub, and radially extending spokes joining the rim to the wheel hub. The ends of the loop abut the outer edge of the wheel rim at a position above the wheel's hub or center. As is appreciated, the back panel, 3, contains a relatively wide surface area as defined by its length and height. The length of the back panel is such that the upper end bridges a chord of the circular steering wheel rim as shown in FIG. 1. Consequently, the back panel abuts the steering wheel rim, at least the upper end of the steering to provide two places of support, and the central hub and/or spokes to provide, through such physical contact, additional support for the assembly. Of course, in alternative embodiments rear panel 3 may be of lesser width. In such instance the back panel rests against the central hub and/or the steering wheel spokes.

When the tray assembly is to be mounted to the steering wheel the user simply inserts the loop formed by strap 11 over the top of the steering wheel and allows the assembly to slide downwardly on the steering wheel until the periphery of the steering wheel bars further downward movement, where the maximum extent of the loop between the right and the left sides equals the length of the cord formed between two portions on the periphery of the steering wheel. The user thereafter may initially adjust the angular orientation of the assembly to ensure that the tray portion is level, at least laterally, with hinge 5 positioned horizontal.

Preferably each of tray assembly portions 1 and 3 are fabricated of a rigid vinyl material and, for economy of production, each portion is essentially of the same size and shape with the tray apparatus being formed as a unitary one piece structure of molded plastic material or other suitable material as meets the described function. Hinge 5, in such preferred construction, is formed, preferably, by a weakened portion of the vinyl material, much like the hinge formed on the common vinyl students three ring notebook binders and other plastic notebooks, thereby reducing the overall construction cost. As those skilled in the art appreciate, other materials may be used for this purpose as well, including fiberboard and corrugated plastic, which possess suitable rigidity as enables the tray portion to support and hold articles of food and the like.

As illustrated in a right side elevation view of FIG. 2 and the partial side pictorial view of FIG. 3, which may be considered simultaneously, with the assembly open for use strap 9 serves to restrain the maximum angular extent of pivoting of tray 1 relative to back panel 3, this is to the left counterclockwise in the figures. In the illustration this angular extent is greater than 90 degrees, suitably approximately 120 degrees, as would conform generally to the range of angles between the steering column and the horizontal in various models of automobiles. Strap 7, not visible in this view, is ideally identical to strap 9 in size, structure and position relative to the adjacent panel edge, but is located on the left side of the assembly.

The left most end of strap 9 extends through a narrow slot, 16b, in tray 1. On the rear or underside of tray 1 strap 9 is bunched, as represented at 9a, and suitably sewn together so as to provide a wide extent of strap at that end, greater in size than slot 16b. Accordingly, any downward force as may be caused by the weight of the tray and any items added to or disposed upon the tray are not sufficient to either break strap 9 or cause the bunched end of the strap to exit or be pulled through the narrow slot. Moreover, the strength of the tray is sufficient to prevent breaking or enlargement of the slot through such pulling. At the right side end strap 9 is threaded through narrow slot, 14b, located in back panel 3 and is similarly bunched on the back or rear side of the back panel to a size larger than slot 14b so as to prevent the strap from being withdrawn by force exerted thereon. However, a special construction is used at this end to allow for adjustment of the length of strap between the two panel portions. This structure incorporates not only a bunched end to the strap but a brad connector, 10, the details of which are discussed hereafter at greater length. It is appreciated that the described structure with respect to strap 9 is the same for strap 7 in respect of the relationship between the straps end associated slots 14a and 16a and the back panel and tray.

The strength of the materials used to fabricate the tray, the back panel and the strap is sufficient as to withstand any of the forces caused in normal use by placing food, books and other items on the surface of tray 1. This particularly holds true at the juncture of end 9a and the strength of the respective panel and tray material in the location around the slot through which the strap protrudes and is bunched.

Straps 7 and 9 should be inelastic, inflexible, limp and strong. The straps are non-stretchable and should not stretch under the weight of the tray and supported contents. They should also be relatively limp so as to allow the tray and back portion to be pivoted with the strap bunched and folded. If the strap is made of cloth or other woven materials as have the foregoing characteristics, whether natural fibers or, as preferred, synthetic fibers, the weave should be of the ordinary, non-stretchable kind.

As illustrated to an enlarged scale in the partial section view in FIG. 3, the length of the ribbon at 9b is folded in a serpentine pattern. Brad 10 is a conventional brass metal brad available at the office supply stores that is typically used for binding papers together. The brad is used to firmly bunch a predetermined length of strap into the folded pattern illustrated, to hold that bunched portion together and to serve as a stop. Given a strap of predetermined length overall, the greater the number of folds incorporated within the bunch at the end, the greater the portion of strap is subtracted from and the shorter the remaining length as remains exposed between tray and back portions 1 and 3. The shorter that exposed remainder, consequently, the smaller the angle that is formed between the two portions about the axis of hinge 5.

Strap 9 contains small slits, like buttonholes, formed at various positions along the strap's length as is better illustrated in FIG. 7 to which brief reference may be made. These slits are shown oriented transverse the width of the strap. However, they may be oriented alternatively along the strap's longitudinal axis as well. The strap end is folded over in either manner illustrated in FIGS. 8 and 10 and the slits are aligned to essentially form a passage. The brass fastener contains a head and, attached thereto, two elongate legs. The legs of the brass fastener are inserted through the slits and the fastener's legs are then spread apart, as illustrated, to hold the strap's end folded together or, as variously termed, bunched between the legs and the head of the fastener. The spread apart fastener legs also serve as a stop or barrier that prevents the end of the strap from being drawn through the slot in the back panel under normal forces caused by the weight of the tray portions and items placed on that portion.

FIG. 4 illustrates to an enlarged scale and in partial section view taken along the line A-A of FIG. 1 an upper right hand portion of back panel 3 as viewed from the front. As illustrated in dotted line, the back panel contains a the notch, 4, which is rectangular in shape, located just below the top edge of the panel. The notch serves to guide or maintain strap 11 in a relatively horizontal position. A corresponding notch is included on the left side of back panel 3 and is aligned with the first notch. Ideally, the notches guide the ends of the strap to prevent the tray assembly from suddenly dropping in position under the weight of the contents placed on the tray as might encourage some of those items to spill.

A fragmentary rear elevation view of the rear side of back panel 3 is illustrated to a slightly enlarged scale in FIG. 5 with straps 7, 9 and 11 in place in assembled position and FIG. 6 shows that same view with the straps omitted. The two views may be considered together In these views only the top and lower intermediate portions of the back panel's surface are illustrated; the intermediate portion, which constitutes simply a plain flat surface, and the lower most bottom portions do not add to the description of the invention, and are omitted in these figures. A portion of strap 11 is shown extending between the left and right sides of the figure and droops slightly from the horizontal. The ends of strap 11 extend through slots 12a and 12b in the right and left sides of panel 3, that is, right and left (as viewed from the opposite side than is illustrated in this figure), are bunched up and sewn together in the same manner as earlier described in connection with one end of ribbon 9, with those ends represented at 11A and 11B in the figure.

Notch 4, earlier described, which serves as a guide to maintain strap 11 essentially horizontal when the assembly is in use is illustrated on the right and the counterpart notch 6 is illustrated to the left. Notches 4 and 6 and slots 12a and 12b are aligned with the midpoint of each such element being colinear with an imaginary line running parallel to the top edge of panel 3. The major axes of slots 12a and 12b extend vertically in the figure. Slots 14a and 14b on the lower side are symmetrically located and have their major axes coaxially aligned with those axes extending parallel to the top edge.

Suitably, strap 11 is mounted to panel 13 and the ends are bunched and sewn during the assembly process. Other alternatives as might expedite manufacture may also be used. As example, one end of strap 11 may be sewn while the other end may use a brass brad arrangement, identical to that described for straps 7 and 9. That alternative allows for some mass production technique in the assembly of at least one end of the strap. To complete assembly of the strap one need only to insert the strap's end through the slots and insert the brad arrangement allowing but one assembly operation.

As is apparent from the preceding figures, the partial loop formed by the strap and the surface of back panel 3 forms a yoke or collar as collars a portion of the auto's steering wheel. To the lower left in the figure the end 9b of strap 9 is illustrated. Its counterpart end on strap 7 is illustrated as 7b, shown on the right, containing a corresponding brass brad, 8.

FIG. 7, earlier referred to, presents strap 9 in a partially assembled form. The strap includes the bunched end 9a, as formed and held by a stitch, 14, suitably of nylon thread, sewn across the folds, as by use of a conventional sewing machine. Additionally, at the right end the strap contains a series of slits, 16, only one of which is numbered The slits are spaced apart evenly and coaxially aligned to form a passage. The slits may be formed by cutting with a knife or by a button hole type sewing mechanism. The length and width of the slit is just sufficient in dimension to allow extension of the brad's legs, but not large enough to permit passage of the brad's head. During assembly the free end of the strap may be assembled through the slot in lower tray panel 1, entering through the panel's rear side and through the front side of back portion 3. As illustrated in FIG. 8 in a pictorial side view, the end of strap 9, intended to serve as part of the tilt angle adjusting mechanism for the tray, may be wrapped or looped around to align a number of the described slits. Thereupon the brass brad legs are inserted through the aligned slits as forms a passage and the brad's legs are then spread apart.

An alternative method of looping the strap end is pictorially illustrated in FIG. 9. As shown in this alternative the looping is of a serpentine arrangement. As pictorially presented in FIG. 10, the end of ribbon 9 may be folded and then held together in that fold by sewing a stitch 14 across the fold, using a thread of appropriate strength, suitably nylon material.

As is appreciated, with a fixed length to each of straps 7 and 9, the greater the portion of the respective strap that is used to form the loops or bunch, then the lesser the length of strap remaining for extension between the tray and panel portions and, consequently, the smaller the angle that can be formed between the two panel portions when the apparatus is open for use. Automobiles rarely have steering wheels oriented perpendicular to the horizontal. Most are at some angle greater than 90 degrees. By adjusting the portion of the strap formed into the bunched loop on each of the right and left sides, the smaller the angle that may be formed between the two portions of the tray apparatus. The tray apparatus, thus, may be adjusted to level the tray portion, that is, to maintain the tray portion horizontal, for use in different models of automobiles. The leveling adjustment referred to is the leveling in a direction orthogonal to the axis of hinge 5. The hinge axis, as recalled, was set to the horizontal by manual adjustment of the back panel position on the steering wheel.

Food, beverage and other edibles may be placed on the tray. Moreover, a magazine may be stood upright or propped on the tray with the bottom edge of the reading materials propped on the ledge and the top of that reading materials resting against the back panel. As is appreciated, one need only manufacture a single model of tray apparatus for all automobiles. The particular adjustment to fit the individual automobile is left to the user. With one structure for all auto models the manufacturing and, hence, cost advantage to the invention in achieving low cost volume production is apparent.

In one specific example according to the embodiment of FIG. 1, tray 1 was 13 inches in length by 8.5 inches in depth, panel 3 was 13 inches in length by 8.5 inches in height. Each tray and panel was approximately ⅛th inches thick. Slots 12a and 12b were symmetrically located in back panel 3 spaced 11 inches apart with each slot located one inch from the respective adjacent side edge. Such slots were one-half inch in height and one-eighth inch wide. Slot 14a was located approximately one half inch from left side edge and 2.5 inches above the pivot hinge 5. Corresponding slot 14b was located one half inch from the right side edge of panel 3 and at the same height above the pivot point as slot 14a. Both slots were centered along a line running through the midpoint of vertically oriented slots 12a and 12b. Slots 14a and 14b were of one-half inch in width by one-eight inch in height. Notches 4 and 6 were each one half inch in height, the vertical direction and one-quarter inch in depth. Slots 16a and 16b in tray 1 were of the same dimension as slots 14a and 14b, are symmetrically located in the tray with the right edge of slot 16b being located one-half inch from the right edge as viewed in FIG. 1 and the left edge of the opposed slot, 16a, being located one-half inch from the left edge of the tray. Straps 7 and 9 were ribbons of nylon material of approximately 8.5 inches in length unassembled unfolded by one-half inch in width. Of that length approximately 6 inches was extended between the two trays and one inch was stitched into a short bunch at one end of the ribbon. Strap 11 was the same width and material as straps 7 and 9. Strap 11, however, was 17.5 inches in length unfolded and unassembled. With each end of the strap bunched, taking up approximately 2.5 inches of that length when assembled, approximately 15 inches remained to form the loop.

The embodiment described in FIG. 1 contained a single pivot joint or hinge 5. As presented in partial side elevation view in FIG. 11, in which parts corresponding to those in the prior embodiment are similarly labeled, an alternative embodiment of the invention may contain two such hinges spaced apart, such as hinges 5' and 5", located at opposite sides of a third rectangular shaped narrow panel 19'. As one recognizes, the foregoing is the same type of corner fold arrangement that is found in plastic data binders and in notebooks, available at the stationers. Indeed, one practical embodiment of the invention constructed according to the preceding FIG. 110 employed an ACCO brand data binder available from the ACCO International, Inc. company of Chicago, Ill.

Although double hinges do not appear to serve greater functional advantage than a single hinge in this combination, there is an economic advantage In practice economies of manufacturing may be achieved if such existing binders may be used and applied to the construction of the present tray apparatus. Those binders are presently available in quantity for other purposes Hence, production has achieved economies of volume manufacture The existing high volume for that notebook type structure provides appropriate component material at low cost for the present structure Even though the tray apparatus is not produced in high volume to provide sufficiently low cost using a more custom design, the cost of an essential component remains low.

Additionally, some styles of those data binders contain a clip attached to one surface within which to insert paper. A portion of that clip fastener may be removed, leaving the clip fastener's base installed. That base is a metal member containing an upwardly protruding portion located spaced from the hinge. In use in the present combination, that base clip portion serves as a ledge. Consequently, reading material may be positioned upright abutting that ledge. For aesthetic reasons and efficiency, the embodiment presented in FIG. 1 is preferred. However, for immediate availability and economy in low volume the embodiment presented in FIG. 11 has definite cost advantage, and in that situation would be preferred. A minor advantage to this double hinge construction is that the ledge may be of greater height and/or located more proximate to the pivot axis than otherwise without interfering with folding up the tray apparatus for storage.

Although the preferred embodiment employs a sewn stitch to permanently bunch the end of the ribbon, other less desirable alternatives are available. The same effect may conceivably be achieved by simply tying one or a number of knots in place for the fixed end. This is obviously not as desirable, as considerable time consuming effort may be needed to bulk up the size of the knot to a size larger than the slot in the associated panel. Alternatively, a knotted bow may be used for that purpose. Similarly, the adjustable end of the cloth type strap may be fashioned with knots as well. However, as one not accustomed to placing knots can appreciate, sometimes the knot does not locate in the desired position and, consequently, for most persons this alternative does not easily permit adjusting the length of strap 9. More expensive clips or ties may be substituted for the adjustable end. However, as those are generally of more expensive construction than the brass brad for economic reasons those obvious alternatives are less preferred.

Taken by itself, the strap and notch arrangement attached to back panel 3, in its fixed form or in the alternative adjustable form as described, provides an improved combination in a tray apparatus. By means of the back strap the tray apparatus is mechanically coupled, attached or, as variously termed, mounted to the steering wheel in an inexpensive manner allowing for easy horizontal adjustment of the hinge axis.

The planar surface of the back panel provides an additional advantage to the low cost construction. Where the tray apparatus is intended for premium use, the panel can have the sponsor's advertising material applied to the surface, such as a restaurant menu, which would remain visible to the driver while eating. This advertisement is represented in dash lines in the embodiment of FIG. 1. As an alternative to ledge 15 it is possible to simply form or mold one or more longitudinally extending grooves and/or surface protrusions within tray 1 as would be used to prop up reading material This eliminates an assembly step and permits the two portions to be folded more compactly.

The term "strap" has been used as the preferred terminology in a generic sense in the foregoing description and in the succeeding claims. It is understood that the terms "ribbon" or "web" are encompassed within the term strap, as characterizing the form of a narrow band, as distinguished from a string or thread, that is strong and does not stretch, yet is inelastic and limp and may be folded and looped or bunched, as illustrated, much like a string. It is a web whose width is greater than its thickness.

It is believed that the foregoing description of the preferred embodiment of the invention is sufficient in detail to enable one skilled in the art to make and use the invention. However, it is expressly understood that the details of the elements which are presented for the foregoing enabling purpose are not intended to limit the scope of the invention, in as much as equivalents to those elements and other modifications thereof, all of which come within the scope of the invention, become apparent to those skilled in the art upon reading this specification. Thus the invention is to be broadly construed within the full scope of the appended claims.

What is claimed is:

1. Tray apparatus for mounting to a circular shaped automobile steering wheel of predetermined diameter comprising:

a first panel, with said panel comprising a generally rectangular shape and having a front and rear surface and left and right sides;

a second panel, with said second panel comprising a generally rectangular shape for receiving articles on a surface thereof;

hinge means connecting said first and second panels along an edge thereof for permitting relative pivotal movement between said first and second panels to permit said panels to be moved between a folded position and an open position;

restraining means connected to said first and second panels for limiting pivotal movement of said second panel relative to said first panel in one direction to thereby hold said second panel in a suspended open level position, whereby articles may be placed on a surface thereof; said restraining means comprising first strap means located on a left side and second strap means located on a right side of said panels;

said first and second strap means being of a relatively nonstretchable characteristic in an axial direction and of a limp characteristic in direction orthogonal to said axial direction;

a first pair of slots in said first panel and a second pair of slots in said second panel with said slots being spaced from said hinge means;

said first strap means having a first end extending through a first one of said slots in said first panel and a second end extending through said corresponding slot in said second panel;

said second end of said first strap means including a bunched end portion with said end portion defining a cross sectional area of material greater than the area of said slot associated therewith to prevent withdrawal of said end through said associated panel slot;

said first end of said first strap means including a bunched section located at the rear side of said first panel; said bunched section including: a plurality of spaced slits extending through said strap means with at least a portion of said slits being aligned to form a singular passage; brad means, said brad means containing a brad head and two legs attached at one end to said head; said brad means having a portion of said legs extending through said singular passage formed by said aligned slits with said brad head being on one side of said bunched end section and the leg portions spread apart on the other side of said bunched section; wherein said brad legs prevent withdrawal of said bunched section through said associated slot in said first panel and unbunching of said end section;

coupling means for coupling said first panel onto said automobile steering wheel; said coupling means comprising: third strap means, with said third strap means having one end connected to said first panel proximate the upper left side thereof, and an opposed end connected to said first panel proximate the upper right side thereof and defining a loop about the rear surface of said first panel; said defined loop being of a maximum extent less than the outer diameter of said steering wheel; said third strap means and said first panel defining therebetween a yoke in which to receive and pass there through a portion, less than half, of the steering wheel rim to thereby suspend said tray apparatus from said steering wheel; said rear surface of said first panel having at least on surface portion for abutting at least on portion of said steering wheel.

2. The invention as defined in claim 1 further comprising a ledge of short height; said ledge being connected to and protruding upwardly from the upper surface of said second panel and in a position on said upper surface spaced from said hinge means for bracing reading material in an upright position on said second panel and against said first panel 3. The invention, as defined in claim 1, wherein said first panel contains a vertically oriented slot spaced from a first lateral side edge of said first panel;

a notch in said first panel extending from said first lateral side edge; said notch being rectangular in shape and being located in axial alignment with said slot;

and wherein said third strap means includes an end extending through said slot from said first side to said rear side of said first panel; said end of said third strap means being fixedly bunched together on the rear side of said panel to define a surface area greater than the cross sectional area of said slot to prevent withdrawal of said strap end through said slot.

4. The invention as defined in claim 1, wherein said first and second panels and said hinge means are formed of an integral one-piece molded assembly of plastic material with said hinge means comprising a weakened portion of said plastic material.

5. The invention as defined in claim 1, wherein said hinge means comprises further: a narrow rectangular strip defining a third panel; first hinge means joining said third panel to said first panel for permitting pivotal movement there between; and second hinge means joining said third panel to said first panel for permitting pivotal movement there between.

6. The invention as defined in claim 1 wherein each of said strap means comprises a web of woven nylon material.

7. Tray apparatus for mounting to a automobile steering wheel having a circular rim of predetermined outer diameter, a central hub and radially extending spokes connecting said rim to said hub, comprising:

a first panel; said panel comprising a relatively flat surface of generally rectangular shape and of a predetermined width;

a second panel; said second panel comprising a generally rectangular shape defining a tray for receiving articles on a surface thereof;

first means connecting said first and second panels along an edge thereof for permitting relative pivotal movement between said first and second panels to permit said first and second panels to be pivoted between a folded position and an open position;

second means for limiting pivotal movement of said second panel relative to said first panel in one direction to a predetermined extent to thereby hold said second panel in a suspended open level position, whereby articles may be placed on a surface thereof;

coupling means for coupling said first panel onto said automobile steering wheel; said coupling means comprising:

strap means having one end connected to a first predetermined position thereon said first panel at second position thereon spaced from said first position, and an opposed end connected to said first panel and defining a loop about the rear side of said first panel; said defined loop being of a maximum extent less than the diameter of said steering wheel and said strap means being relatively non-stretchable in an axial direction and of limp characteristic in direction orthogonal to said axial direction; said strap means and said first panel defining therebetween a yoke in which to receive and pass there through a minor portion, less than half, of the steering wheel rim to thereby suspend said tray apparatus from said steering wheel.

8. The invention as defined in claim 7, wherein said defined loop further comprises a maximum extent greater than the length of said first panel and wherein said rear surface of said first panel having surface portions abutting spoke and/or hub portions of said steering wheel.

9. The invention, as defined in claim 7, wherein said first panel contains a slot of predetermined cross section area, said slot being spaced from a lateral side edge of said first panel;
a notch in said first panel extending from a first side edge of said first panel; said notch being rectangular in shape and being located in axial alignment with said slot;
and wherein said strap means includes a first end extending through said slot from a front side to a rear side of said first panel; said first end of said strap means being fixedly bunched together on said rear side of said panel to define a surface area greater than the cross section area of said slot to prevent withdrawal of said first end of said strap through said slot.

10. The invention as defined in claim 7 wherein said strap means includes a first end with said first end including a bunched section at the rear side of said first panel; said bunched section including: a plurality of spaced slits extending through said strap means with at least a portion of said slits being aligned to form a singular passage; brad means, said brad means containing a brad head and two legs attached at one end to said head; said brad means having a portion of said legs extending through said singular passage formed by said aligned slits with said brad head being on one side of said bunched end section and the leg portions spread apart on the other side of said bunched section; said brad legs preventing withdrawal of said bunched section through said associated slot in said first panel and preventing unbunching of said end section to said strap means.

11. The invention as defined in claim 9, wherein said first and second panels and said first means are formed of an integral one-piece molded assembly of plastic material with said first means comprising a weakened portion of said plastic material.

12. The invention as defined in claim 11 wherein said strap means comprises a web of woven nylon material.

13. The invention as defined in claim 9, wherein said second means comprises:
second strap means located on a left side and third strap means located on a right side of said first and second panels;
said second and third strap means being relatively nonstretchable and of limp characteristic;
each of said second and third strap means having a width and a thickness with said width being substantially larger than said thickness;
said first panel including a first pair of slots and said second panel including a second pair of slots with said slots being spaced from said first means;
said second strap means including a first end extending through a first one of said slots in said first panel and a second end extending through said corresponding slot in said second panel;
said second end of said second strap means including a bunched end portion with said bunched end portion defining a cross sectional area of material greater than the area of said slot associated therewith to prevent withdrawal of said end through said associated slot in said second panel;
said first end of said second strap means including a bunched section at the rear side of said first panel; said bunched section of said second end including:
a plurality of spaced slits extending through said strap means with at least a portion of said slits being aligned to form a singular passage;
brad means, said brad means containing a brad head and two legs attached at one end to said head; said brad means having a portion of said legs extending through said singular passage formed by said aligned slits with said brad head being on one side of said bunched end section and the leg portions spread apart on the other side of said bunched section; said brad legs preventing withdrawal of said bunched section through said associated slot in said first panel and unbunching of said end section.

14. Tray apparatus for mounting to a automobile steering wheel having a circular rim of predetermined outer diameter, a central hub and radially extending spokes connecting said rim to said hub, comprising:
a first panel; said panel comprising a relatively flat surface of generally rectangular shape and of a predetermined width;
a second panel; said second panel comprising a generally rectangular shape defining a tray for receiving articles on a surface thereof;
first means connecting said first and second panels along an edge thereof for permitting relative pivotal movement between said first and second panels to permit said first and second panels to be pivoted between a folded position and an open position;
second means, spaced from said first means, connected to said first and second panels at positions of said panels spaced from said first means, for providing additional support to said second panel and for restraining pivotal movement of said second panel relative to said first panel in one direction to thereby hold said second panel in a suspended open level position, whereby articles may be placed on a surface thereof;
coupling means for coupling said first panel onto said automobile steering wheel; said coupling means comprising:
strap means having one end connected to the left upper side of said first panel, and an opposed end connected to the upper right side of said first panel and defining a loop about the rear side of said first panel; said loop being of a maximum extent greater than the width of said first panel and less than the diameter of said steering wheel and said strap means being relatively non-stretchable in an axial direction and of limp characteristic in direction orthogonal to said axial direction; said strap means and said first panel defining therebetween a yoke in which to receive and pass there through a portion, less than half, of the steering wheel rim to thereby suspend said tray apparatus from said steering wheel; said rear surface of said first panel having surface portions abutting spoke and/or hub portions of said steering wheel.

* * * * *